July 6, 1937.  F. D. WENN  2,086,010
HAND OPERATED BRAKE LEVER
Filed Sept. 16, 1936
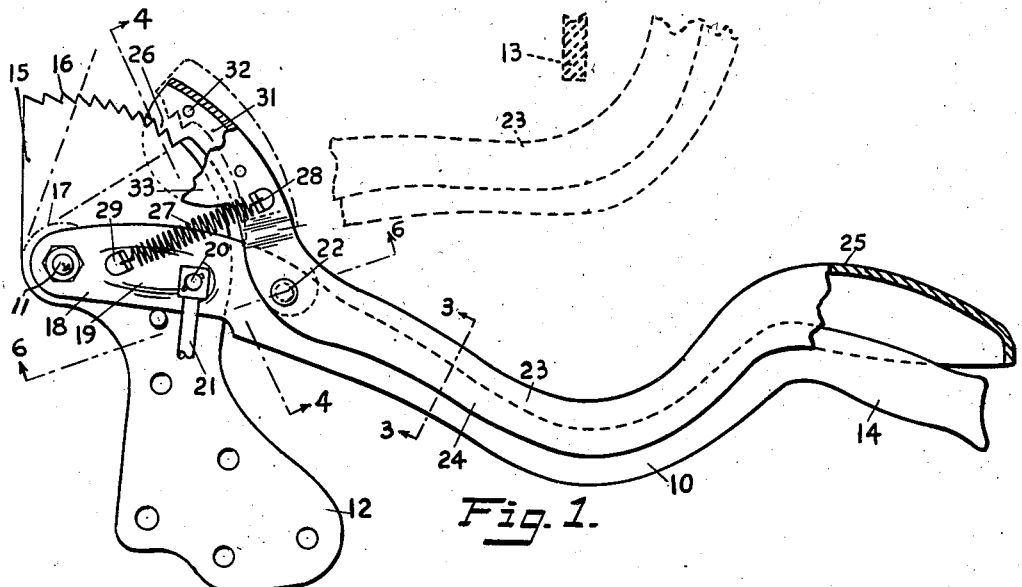
Fig. 1.
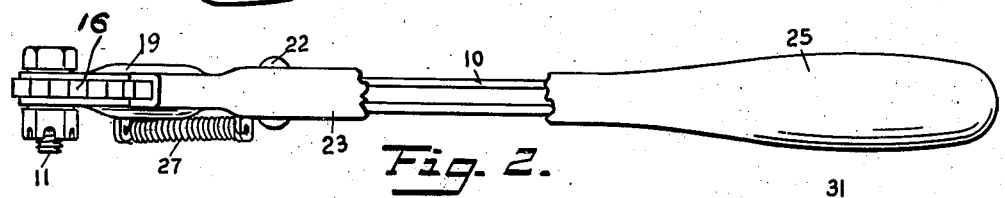
Fig. 2.
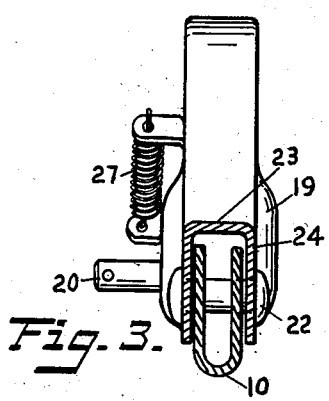
Fig. 3.
Fig. 5.
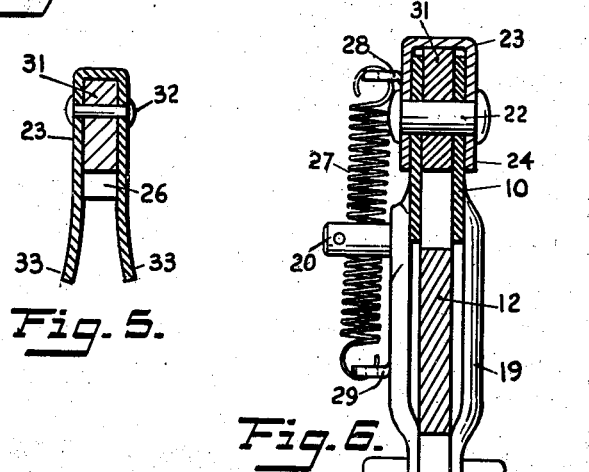
Fig. 6.
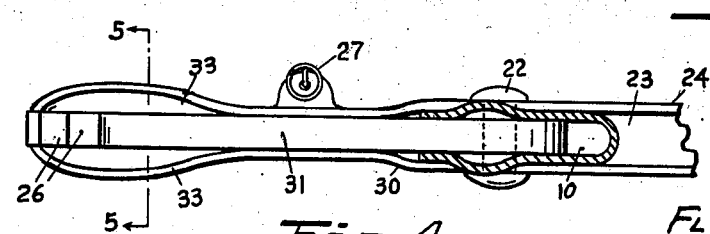
Fig. 4.
INVENTOR.
FLOYD D. WENN,
BY Louis Ulmer
ATTORNEY.

Patented July 6, 1937

2,086,010

UNITED STATES PATENT OFFICE 2,086,010

HAND OPERATED BRAKE LEVER

Floyd D. Wenn, Binghamton, N. Y., assignor to The Brewer-Titchener Corporation, Cortland, N. Y., a corporation of New York Application September 16, 1936, Serial No. 100,980

6 Claims. (Cl. 74—537)

This invention relates to certain novel structural aspects pertaining to an inherently simple emergency brake lever for automobiles or the like that facilitates economical fabrication and assembly on a rapid productive scale, there being but two essential pivotal points required to mount my unitary lever devices. A primary lever is herein swung on a main fulcrum carried by a stationary rack sector. Pivotally mounted on such primary lever is a spring actuated, L-shaped secondary lever of sheet metal having a channel shaped body profile. One end of such auxiliary finger lever is extended into cooperative relationship with the handle region of said primary lever while the other or offset toe end of such finger lever is provided with rigidly attached pawl means arranged to interlockingly engage ratchet teeth that are formed in the rack sector or analogous bracket means without need of any supplementary pawl rod or the like link connections.

The face of my ratchet teeth is purposely kept comparatively wide and the cooperating pawl preferably made equally extensive to reduce wear and potential slippage. In order that such pawl may assume a materially wider face than the sheet metal body thickness, I preferably build up my secondary lever in composite fashion by insetting a case hardened, relatively thick pawl lug that is fixedly secured between lipped flange portions of such lever. These complementary lips are disposed to snugly straddle the respective sides of the rack sector to obviate rattle and guide such pawl into proper operative engagement when the grippable secondary lever end is released. The present crooked lever type is more particularly designed for horizontal disposition having the main fulcrum located interiorly behind the vehicle cowl and its manipulative grip end projecting forwardly underneath the instrument panel to fall within easy reach of the driver, the lever then being raised to apply the brakes.

The object of my invention is to devise an improved lever of the indicated character adapted to be easily incorporated in automotive vehicles and fabricated on a rapid productive basis at the minimum of machine labor and assembly cost and which lever when installed, is capable of applying an effective braking action over a prolonged operative period without tooth slippage.

Reference is had to the accompanying one sheet of drawings which are illustrative of a preferred embodiment and in which:

Fig. 1 is an elevational side view of an assembled brake lever equipped with my improved devices, and Fig. 2 a top view thereof.

Fig. 3 represents a cross-section through oppositely channeled levers taken along line 3—3 of Fig. 1.

Fig. 4 shows an enlarged detail of my inserted pawl plate as seen obliquely along line 4—4 of Fig. 1, while Fig. 5 is a cross-sectional end view of such lever toe taken along 5—5 of Fig. 4.

Fig. 6 depicts certain assembly details viewed cross-sectionally along 6—6 of Fig. 1.

As practiced herein, a primary lever 10 of S-shaped contour is preferably but not necessarily stamped up from a sheet metal blank. One end of my cross-sectionally channeled lever is provided with a main fulcrum 11 that is fixedly carried by a warped bracket plate 12 and which plate may be mounted interiorly behind and beneath the instrument board 13. The opposite lever end is shaped into a hollowed handle portion 14 which extends rearwardly from the lever fulcrum within convenient reach of the vehicle driver.

Said bracket plate may be demountably supported by some suitable cowl fixture and equipped with an upstanding sector plate 15 of which the pointed axial region is apertured to allow of entering the fulcrum 11 therethrough. The arcuate perimeter of such sector plate may be serrated to provide a series of case hardened ratchet teeth 16 disposed about the fulcrum axis. The respective radially transverse faces of all such cut teeth are preferably directed into tangency with the common base circle 17 to permit free pawl withdrawal without undercut drag. Said sector plate is purposely kept relatively thick to afford an adequate tooth width that is not likely to wear excessively after protracted usage.

The fulcrum end of my primary lever may be bifurcated to provide for a pair of forked legs such as 18 which are preferably disposed to straddle the sector plate 15, as shown. The respective side faces of said legs may be oppositely bumped at 19 to provide a lateral stiffening thereof. A brake rod actuating pin 20 may be carried in one such reenforced leg region to mount a depending brake link rod 21 thereon. This link may slidably drop through a small opening in the car floor in weather sealed fashion and therebeneath be operatively connected to the brake gear.

A pivot 22 is located contiguous to the crotch region of my forked primary lever and mounted to tilt thereon, is an essentially L-shaped finger or secondary lever 23 whose overall length may be kept substantially equal to that of the primary lever 10. The finger lever is given a cross-sectionally channel shaped profile throughout the length thereof of which the side flanges such as 24 are fitted to embracingly straddle a portion of the reversed flange elements of the primary lever in the Fig. 3 manner. The pivot 22 is disposed intermediate the finger lever ends. The forwardly extended lever end may be given a crooked contour conforming to that of the primary lever so as to terminate in a chambered manipulative grip 25 positioned to perimetrically embrace and cooperate with the handle portion 14 of the primary lever as indicated in Fig. 1.

The toe end of said finger lever is preferably provided with plural teeth or pawl means 26 which releasably engage certain of the ratchet teeth 16. The latter upturned teeth may be disposed in an offset relation to the axial center line running through the fulcrum 11 and the pivot 22. A suspended spring or similar resilient return means 27 serves to automatically retain the pawl 26 in operative engagement with said teeth when the grip 25 is released. The looped spring ends are preferably hooked into raised ears such as 28 and 29 whose outstanding perimeters are respectively pierced and thrown up out of different sheet metal lever stock, as shown. It will be obvious that a squeezing of such grip toward the handle 14 will release the pawl means and permit the brake to be applied by a simultaneous lifting of the primary and secondary levers toward the instrument board 13 into the set dotted Fig. 1 position, the link rod 21 then being placed under tension.

As detailed in Fig. 4, the laterally spaced flanges of my channel shaped toe end of the finger lever 23 are purposely contracted at 30 to snugly nest therebetween an inset elongated pawl lug 31 of which the innermost end may be apertured to receive the pivot 22 therethrough. The opposite end of this metal lug has one or more hardened teeth 26 cut therein. The use of such multiple teeth increases the effective pawl life against excessive wear and otherwise prevents slip of the interlocked ratchet devices.

Said pawl lug may be riveted or spot welded in place at 32 and since wear is naturally concentrated upon the limited teeth thereof, such lug may readily be replaced without requiring complete lever renewal. It will be observed that my composite finger lever is so built up that the use of a comparatively thin sheet metal shank structure still affords a relatively wide tooth face by virtue of the extra thickness given to the inserted striplike pawl 31. This lug is neatly housed within the toe region of my finger lever and carried back into engagement with the pivot 22, said pivot being preferably entered through all of the lever flanges as in Fig. 6 to directly tie the pawl teeth thereto.

In addition, I may extend the respective flanges of my finger lever in the toe extremity thereof to constitute a pair of depending guide lips such as 33 which embracingly span the gap between the released ratchet teeth when raised in the dotted Fig. 1 position. By initially springing such lips inwardly toward each other, they serve as a pawl guide and also retain the finger lever against rattle. My self-contained, tubular brake lever is not only extremely simple to fabricate but is devoid of the usual separate latch rod or the like extraneous pawl actuating devices. The working parts being reduced to a minimum, in turn facilitate rapid assembly work. Owing to the relatively longer purchase afforded by the grip end of my finger lever with respect to the pawl end thereof, the pawl teeth 26 may readily be released even when firmly engaged by the sector 15. As regards my primary lever, this need not necessarily be stamped up from sheet metal nor provided with forks, since a similar result may be had by the use of a non-tubular structure.

As will be understood by those skilled in this art, the disclosed improvements also find application to other than emergency brake levers and that various structural changes in the details and disposition thereof may be resorted to in likewise carrying out my illustrative embodiment, all without departing from the spirit and scope of my invention heretofore described and more particularly pointed out in the appended claims.

I claim:

1. The combination of a primary lever provided with a pivot located between the ends thereof and a sheet metal finger lever having a channeled cross-sectional profile disposed to receive a portion of the primary lever between the channel flanges and which finger lever intermediate its ends is mounted upon said pivot, the respective overall lengths of said levers being substantially equal, corresponding ends of each such lever terminating in substantial registry and which lever ends are adapted to be cooperatively gripped toward each other against resilient return means, a main fulcrum associated with the opposite end region of the primary lever, faced pawl means affixed to and bodily carried by the opposite end region of the finger lever, and sector plate means having a series of ratchet teeth disposed about the fulcrum axis and which teeth are respectively engageable by said pawl means, the face of said pawl being materially wider than the sheet metal thickness of the finger lever.

2. A primary lever provided with a pivot located between the ends thereof, in combination with a sheet metal finger lever mounted intermediate its ends upon said pivot and having a channeled cross-sectional profile throughout the length thereof disposed to receive one end portion of the primary lever between the channel flanges, a corresponding end of each such lever terminating in substantial registry and the opposite end region of the primary lever being bifurcated to provide for forked legs, a main fulcrum bridging said legs, pawl lug means rigidly attached between the channel flanges of the opposite end region of the finger lever, and sector plate means interposed between said legs and having a series of ratchet teeth grouped about the fulcrum axis, the respective teeth being releasably engaged by said pawl lug means.

3. A sheet metal primary lever provided with a pivot located between the ends thereof and of which lever one such end region has a cross-sectionally channeled profile and its opposite end region bifurcated to provide forked legs, in combination with a sheet metal finger lever shaped to provide a channel profile throughout the length thereof and which finger lever intermediate its ends is mounted upon said pivot, one channeled end of the finger lever being arranged to receive therein the aforesaid one primary lever end and the other finger lever end being offset from the axis of the corresponding primary lever end to constitute a toe region, a main fulcrum bridging said legs, apertured pawl means having said pivot entered therethrough and which means is fixedly attached within the channel of said toe region, and sector plate means interposed between said legs and having a series of ratchet teeth grouped about the fulcrum axis, the respective teeth being releasably engaged by the pawl means.

4. A primary lever provided at one end with a manipulative handle and with a pivot located between the respective lever ends, in combination with a sheet metal finger lever mounted intermediate its ends upon said pivot and cross-sectionally shaped to impart a channeled profile throughout the length thereof with one channel end region arranged to receive therein the handle of the primary lever, a main fulcrum for the opposite end of the primary lever, pawl means fixedly associated with the other channel end region, the flanges of such region being extended to constitute complementary guide lips, and sector plate means interposed between said lips and having a series of ratchet teeth grouped about the fulcrum axis, the respective teeth being releasably engaged by the pawl means.

5. A primary lever provided at one end with a manipulative handle and with a pivot located between the respective lever ends, in combination with a sheet metal finger lever mounted intermediate its ends upon said pivot and cross-sectionally shaped to impart a channeled profile throughout the length thereof with one channel end region arranged to receive therein the handle of the primary lever, a main fulcrum for the opposite end of the primary lever, inserted pawl means including a plurality of teeth that is rigidly attached to the other channel end region, and sector plate means provided with a series of ratchet teeth disposed about the fulcrum axis to mesh with the plural teeth of the pawl means, said plural teeth being simultaneously released by squeezing a portion of the finger lever inwardly toward the handle of the primary lever.

6. A sheet metal primary lever provided with a pivot located between the ends thereof and of which one such lever end region has a cross-sectionally channeled profile to include a handle portion and the opposite lever end region is bifurcated to provide for forked legs, in combination with a sheet metal finger lever shaped to provide a channel profile throughout the length thereof and which finger lever intermediate its ends is mounted upon said pivot, one channeled end of the finger lever being arranged to receive the aforesaid one primary lever end and the other finger lever end being offset from the axis of the corresponding primary lever end to constitute a toe region, a main fulcrum bridging said legs, an integral ear projecting from the leg stock and a companion ear projecting from the lever toe stock, a spring suspended between said ears, inserted pawl lug means fixedly attached to said toe region, and sector plate means interposed between said legs and having a series of ratchet teeth grouped about the fulcrum axis, the respective teeth being releasably engaged by the pawl means.

FLOYD D. WENN.